(12) United States Patent
Sueda

(10) Patent No.: US 12,008,611 B2
(45) Date of Patent: *Jun. 11, 2024

(54) SYSTEM AND METHOD FOR REALIZING UTILITY COST SAVINGS

(71) Applicant: Universal Electronics Inc., Scottsdale, AZ (US)

(72) Inventor: Masakazu Sueda, Kanagawa (JP)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,928

(22) Filed: Jul. 19, 2022

(65) Prior Publication Data

US 2022/0351259 A1  Nov. 3, 2022

Related U.S. Application Data

(63) Continuation of application No. 16/574,222, filed on Sep. 18, 2019, now Pat. No. 11,430,026.

(51) Int. Cl.
| | |
|---|---|
| *G06Q 50/12* | (2012.01) |
| *G06Q 30/0283* | (2023.01) |
| *G06Q 50/06* | (2012.01) |
| *G06Q 10/02* | (2012.01) |

(52) U.S. Cl.
CPC ......... *G06Q 30/0283* (2013.01); *G06Q 50/06* (2013.01); *G06Q 10/02* (2013.01); *G06Q 50/12* (2013.01)

(58) Field of Classification Search
CPC .... G06Q 10/02; G06Q 30/0283; G06Q 30/04; G06Q 50/06; G06Q 50/12
See application file for complete search history.

(56) References Cited

U.S. PATENT DOCUMENTS

| | | |
|---|---|---|
| 4,174,064 A | 11/1979 | Pratt, Jr. |
| 4,189,692 A | 2/1980 | Bonnar |
| 7,069,451 B1 | 6/2006 | Ginter et al. |
| 8,369,994 B1 | 2/2013 | Rosen |
| 8,761,951 B2 | 6/2014 | Jerome |
| 9,588,506 B1 | 3/2017 | Clayton |
| 10,354,346 B1 * | 7/2019 | Lok ....................... H04W 12/06 |
| 10,797,639 B1 | 10/2020 | Hoff |
| 10,803,859 B1 * | 10/2020 | Williams ................ G10L 17/06 |

(Continued)

OTHER PUBLICATIONS

Federal Emergency Management Program, Demonstration and Evaluation of HVAC Controller for Lodging Facilities, Case Study DOE/EE-0273, Jul. 2002 (Year: 2002).*

(Continued)

*Primary Examiner* — Daniel Vetter

(74) *Attorney, Agent, or Firm* — Greenberg Traurig, LLP

(57) ABSTRACT

A pre-defined cost savings benefit is provided to a guest as a function of an amount of a calculated cost savings that can be attributed to the guest during a period of occupancy by the guest. Utility cost saving are tracked in real-time during the period of guest occupancy and the guest will be able to use a device to visualize the utility cost savings that are being realized during this period. By being able to view the utility cost savings being realized in real-time, the guest will be incentivized to directly engage in a utility cost savings effort for the personal benefit of the guest which will, in turn, benefit the hotel.

12 Claims, 2 Drawing Sheets

(56) References Cited

U.S. PATENT DOCUMENTS

| | | |
|---|---|---|
| 11,100,465 B1 | 8/2021 | Burge |
| 2003/0149576 A1 | 8/2003 | Sunyich |
| 2011/0061014 A1 | 3/2011 | Frader-Thompson et al. |
| 2011/0202185 A1 | 8/2011 | Imes et al. |
| 2013/0035992 A1 | 2/2013 | Silverman |
| 2013/0054758 A1 | 2/2013 | Imes et al. |
| 2013/0088320 A1* | 4/2013 | Black ............... G06Q 10/06 340/286.08 |
| 2015/0066442 A1 | 3/2015 | Pryor |
| 2016/0371289 A1 | 12/2016 | Kopp et al. |
| 2017/0038224 A1 | 2/2017 | O'Keeffe et al. |
| 2017/0193720 A1* | 7/2017 | Eyring ............... G07C 9/38 |
| 2017/0331287 A1 | 11/2017 | Kopp |
| 2018/0191503 A1 | 7/2018 | Alwar et al. |
| 2019/0089808 A1* | 3/2019 | Santhosh ............ G06Q 10/02 |
| 2021/0266326 A1 | 8/2021 | Chen et al. |

OTHER PUBLICATIONS

ISA/US, International Search Report and Written Opinion issue on PCT Application No. PCT/US2020/050956, dated Dec. 22, 2020, seven (7) pages.

Millar, et al., Hotel Guests' Preferences for Green Hotel Attributes, Hospitality Management, 2008 (Year: 2008).

Stepan, et al., Automation System Architecture for a Smart Hotel, International Conference on Computational Collective Intelligence, ICCCI 2018: Computational Collective Intelligence pp. 457-466 (Year: 2018).

EPO, extended European search report issued on European patent application No. 20866526.5, dated Aug. 12, 2022, 8 pages.

* cited by examiner

SYSTEM AND METHOD FOR REALIZING UTILITY COST SAVINGS

RELATED APPLICATION INFORMATION

This application claims the benefit of U.S. application Ser. No. 16/574,222, filed on Sep. 18, 2019, which application is incorporated herein by reference in its entirety.

BACKGROUND

Existing hotel, energy management systems are designed to reduce costs associated with the usage of one or more utilities. However, guests typically do not directly benefit from any cost savings that might be realized from the use of such systems. Accordingly, guests are generally not incentivized to assist the hotel in using such systems in a manner that will achieve, let alone maximize, the cost savings such systems are intended to provide.

SUMMARY

To address this and other concerns, the following generally describes a system and method for reducing costs associated with the usage of one or more utilities. Generally, the system and method functions to provide a pre-defined cost savings benefit to a guest as a function of an amount of a calculated cost savings that can be attributed to the guest during a period of occupancy by the guest at a hotel. To this end, the system and method will track utility cost saving in real-time during the period of occupancy by the guest. In addition, the system and method will allow the guest to use a device to visualize the utility cost savings that are being realized by the hotel during this period. By being able to view the utility cost savings being realized in real-time, the guest will be incentivized to directly engage in a utility cost savings effort for the personal benefit of the guest which will, in turn, benefit the hotel. Upon check-out of the hotel by the guest, the final calculated value of the utility cost savings during the period of occupancy will be utilized to determine the amount of the benefit that is to be given to the guest.

While the foregoing provides a general overview of a system and method for realizing utility cost savings, a better understanding of the objects, advantages, features, properties and relationships of the subject system and method will be obtained from the following detailed description and accompanying drawings which set forth illustrative embodiments and which are indicative of the various ways in which the principles of the invention hereinafter claimed may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
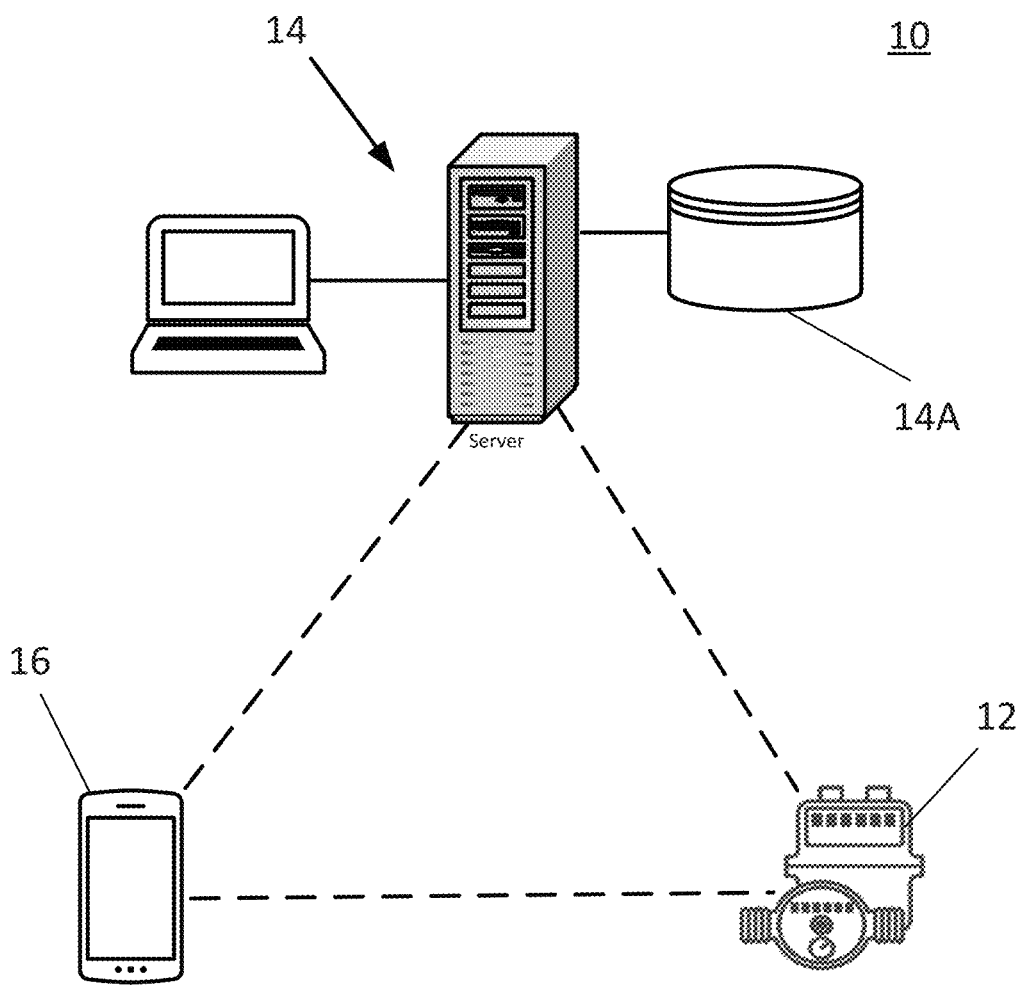
FIG. 1 illustrates an example system for realizing utility cost savings.

With reference to FIG. 1, there is illustrated an example system 10 for realizing utility cost savings. Generally, the system includes one or more meters 12 for measuring usage of a utility, such as electric, gas, water, or the like. The one or more meters 12 are associated with a lodging, such as a room of a hotel/motel, a rental property, etc. (herein collectively referred to as a "hotel room") in which a guest will stay for a period of time. Within the system 10, the meters 12 will be in communication with one or more administration computer/server systems 14 having one or more associated data repositories 14A. As will be appreciated, the communicative connection between the meter 12 and the administration system 14 may be a wired connection, a wireless connection, or a combination thereof. In addition, the communicative connection can be in the form of a local area network ("LAN"), wide area network ("WAN"), or a combination thereof. Furthermore, the communicative connection between the meter 12 and the administration system 14 may be a direct connection or may be an indirect connection using one or more intermediate devices. As will be discussed in greater detail below, it is by use of this communicative connection that the administration system 14 will receive from the meter 12 data that is indicative of utility usage by a guest during their stay in a hotel room.

As further illustrated in FIG. 1, the system 10 will include one or more devices 16 having installed thereon software, such as an "app," for allowing a guest to view information indicative of the utility costs associated with their stay in the hotel room. The device 16 will preferably be a mobile device such that the guest will be enabled to view, in near real-time and from a multitude of locations, information indicative of utility costs and/or utility costs savings that (and reward amounts) are currently being realized by the guest during their stay. In addition, the software may provide a user interface that allows a user to control utility settings, e.g., to view and set a current or upcoming HVAC temperature setting or the like. In another example, such user interfaces may be accessed via kiosks that are dispersed around a hotel property, a television in the guest room, and/or other devices that could be connected to the administration system 14. Such devices may be used alternatively or in addition to mobile devices within the system. As with the meters 12, the device 16 will be in communication with the administration system 14 and the communicative connection between the device 16 and the administration system 14 may be a wired connection, a wireless connection, or a combination thereof and can be in the form of a local area network ("LAN"), wide areas network ("WAN"), or a combination thereof. Furthermore, in the event a device 16 is to be provided utility control capabilities, the device 16 may be provided with software to allow the device 16 to communicate with the administration system 14 to indirectly control a utility system associated with the hotel room or may be provided with software (and the appropriate communication hardware) to directly communicate with and control the utility system associated with the hotel room.

While not illustrated, the system 10 may also be communicatively coupled to a computer system associated with a provider of a utility. In this manner, the system 10 may receive from the utility provider computer system the rates associated with using the utility, e.g., cost for kWh of electricity usage, cost for $ft^3$ of gas or water usage, etc. Such rate information can be provided to the administration system 14 for use by the administration system 14 in calculating utility usage costs or may be provided to the meter 12 (or associated utility system) for use by the meter 12 (or associated utility system) in calculating utility usage costs (provided the meters/utility systems are provided with software to perform such functionality). In the event the meter 12 (or associated utility system) is used to calculate utility usage costs, the meter 12 (or associated utility system) would provide the calculated utility usage costs to the administration system 14 for further use as hereinafter described. The utility usage rates may be provided by/retrieved from the utility provider computer system as needed. It will also be appreciated that, in some systems, the meter 12 may report utility usage to the utility provider computer system whereupon the cost associated with utility usage may be provided by/retrieved from the utility provider computer system in near real-time for use by the system 10 as described below.

Within the system 10, the administration system 14 will store data in the associated data repository 14A in a manner that functions to cross-reference information that is representative of the guest, the hotel room in which the guest is staying, the utilities that are associated with the hotel room, and utility costs incurred by the guest during their stay in the hotel room. By way of example only, the administration system 14 may store data in the data repository 14A that uniquely identifies the guest, data that uniquely identifies the room the guest is occupying, data that uniquely identifies each utility meter that is associated with the room, utility rate-based cost data, data that is read from/provided by each utility meter, data that identifies the guest check-in time, data that identifies the guest check-out time, calculated results information, and the like. As will be appreciated, at least the data that is read from/provided by each utility meter may be stored with a time stamp to allow the system to determine utility cost information that is reflective of utility usage between the guest check-in time and the guest check-out time. In addition, the database associated with the administration system 14 may store actual historical utility usage information and/or desired utility usage information for use in calculating utility cost savings as described further below. For security purposes, the database may also store information that allows the system to access device 16 and/or that will have to be provided by the guest before the guest is provided access to the system 10 by use of device 16. It will be further appreciated that the system 10 may function to block the guest from using a device 16 to at least change any settings associated with a room at the time of guest check-out.

Figure 2:
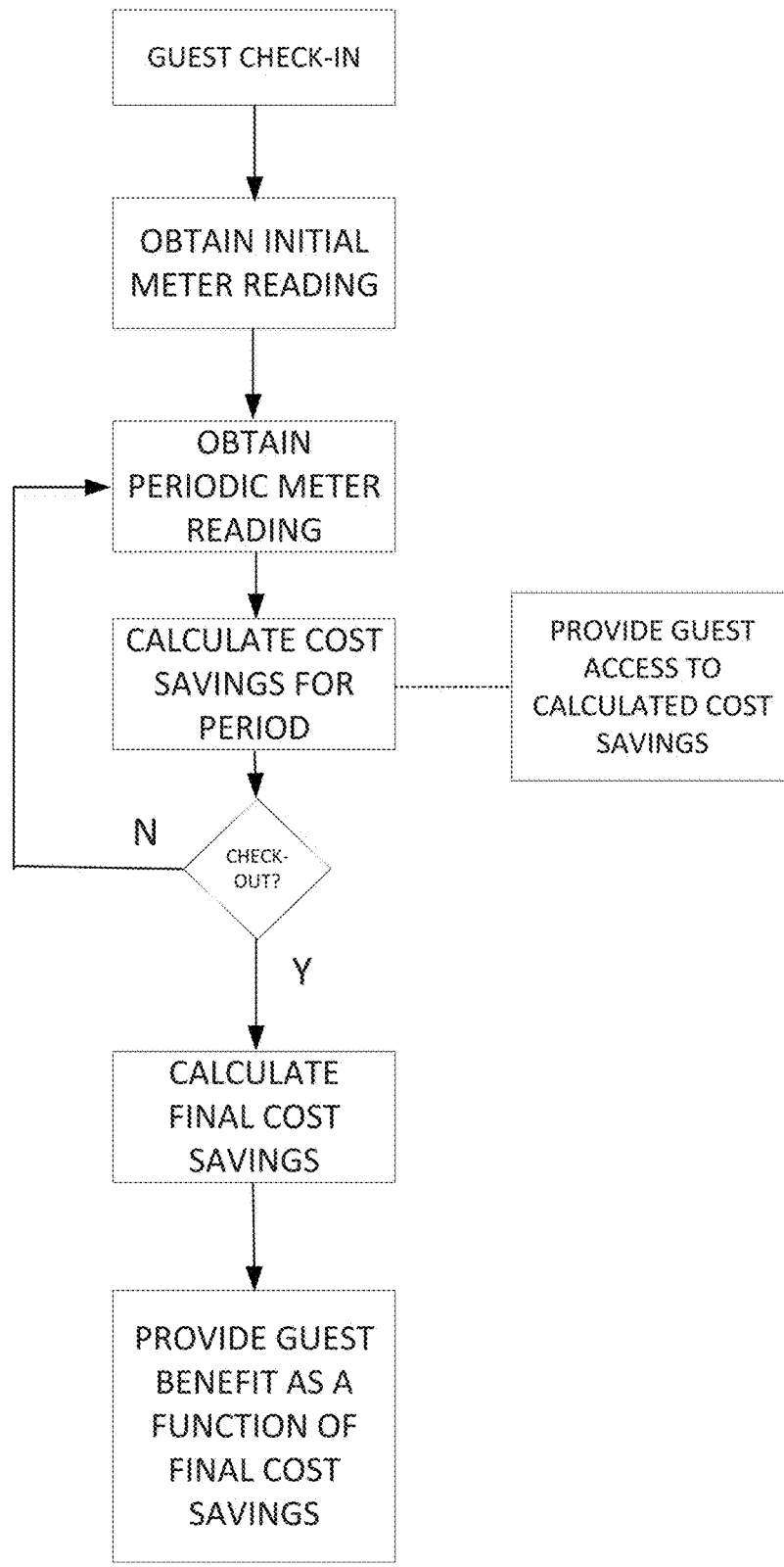
FIG. 2 illustrates an example method for realizing utility cost savings.

Turning to FIG. 2, in an example operation of the system 10, the administration system 14 may periodically issue requests to a meter 12 to acquire utility meter readings. The frequency of such requests can range from around 1 second to around 1 minute. The administration system 14 will then use the received data to determine changes in the utility meter readings from the time of check-in by the guest and will use the determined changes and utility rate information to calculate the utility costs that are associated with the guest's stay. As will be appreciated, the change in the utility meter reading at the time of guest check-in will be zero. The calculated utility costs would then be compared against expected utility costs (which may be actual historical costs) to determine any cost savings. The determined costs savings (and or any other information) may then be pushed to the device 16 or otherwise retrieved by the guest using device 16 as desired.

By way of further example, the administration system 14 may periodically calculate and update the utility cost savings S—defined as the amount of utility cost saving for a guest during the period of their stay—using the following procedures in which:

$A_i$ represents the initial utility meter reading at time of check-in for meter A, e.g., an electric meter having an operating rate of AR;

$B_i$ represents the initial utility meter reading at time of check-in for meter B, e.g., a water meter having an operating rate of BR;

$C_i$ represents the initial utility meter reading at time of check-in for meter C, e.g., a gas meter having an operating rate of CR;

$A_n$ represents a utility meter reading at a periodic time after check-in for meter A;

$B_n$ represents a utility meter reading at a periodic time after check-in for meter B;

$C_n$ represents a utility meter reading at a periodic time after check-in for meter C; and $S_e$ represents the expected utility costs at the time $T_n$ of a periodic meter reading.

$$A_{change} = A_n - A_i$$

$$B_{change} = B_n - B_i$$

$$C_{change} = C_n - C_i$$

Total Utility Cost $TUC_n$ at time $T_n = (A_{change} \times AR) + (B_{change} \times BR) + (C_{change} \times CR)$ $$S_n = S_e - TUC_n$$

Thus, when $T_n$ is the time of guest check-out, the value $S_n$ will be reflective of the total costs savings realized by the guest during their stay in the hotel room.

With respect to the expected utility cost, this value can be based on a historical value, such as an average utility cost associated with a particular guest room over time, an historical utility cost associated with a particular guest room considering the same conditions that are associated with the current guest stay, e.g., outside temperature, a cost estimate provided by the manufacturer of the utility system, or the like as desired.

To further incentivize the guest to realize a highest level of cost savings, the guest is preferably provided with a percentage of any realized cost saving $S_n$. The dollar (or other applicable currency) value of the percentage of the cost saving $S_n$ may be provided to the guest by being removed from their bill at time of check-out, may be provided to the guest as reward points, may be provided to the guest as credit for use in a future stay, or the like without limitation.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A system, comprising:
an administration server;
a controller for an HVAC system communicatively coupled to the administration server; and
a display device separate and apart from the administration server and communicatively coupled to the administration server;
wherein the administration server has programming that causes the administration server:
access the display device to allow use of the display device by a guest to provide a setting for the HVAC system;
control the controller for the HVAC system in response to receiving from the display device the setting for the HVAC system; and
respond to receiving data indicative of the guest checking-out from the lodging by subsequently blocking use of the display device by the guest to provide any further settings for the HVAC system; and
wherein the system further comprises at least one utility meter associated with the HVAC system communicatively coupled to the administration server and the administration server has further programming that causes the administration server to determine a time of the guest check-out of the lodging, receive from the at least one utility meter data indicative of utility usage at the time of the guest check-out, use the data indicative of utility usage at the time of the guest check-out and a data indicative of utility usage at the time of the guest check-in to calculate an amount of cost savings that was realized by the guest, and to cause a benefit to be provided to the guest as a function of the calculated amount of cost savings that was realized by the guest.

2. The system as recited in claim 1, wherein the benefit provided to the guest comprises a reduction in a hotel bill by a percentage amount of the calculated amount of cost savings that was realized by the guest.

3. The system as recited in claim 2, wherein the benefit provided to the guest comprises an addition to a reward points account that is reflective of a percentage amount of the calculated amount of cost savings that was realized by the guest.

4. The system as recited in claim 1, wherein the at least one utility meter comprises an electric meter.

5. The system as recited in claim 1, wherein the at least one utility meter comprises a gas meter.

6. The system as recited in claim 1, wherein the administration server is communicatively coupled to a utility service provider computer system for receiving from the utility service provider system utility usage rate data and wherein the administration server uses the utility usage rate data to calculate the amount of cost savings that was realized by the guest.

7. The system as recited in claim 1, wherein the administration server uses a historical, calculated utility usage cost associated with the lodging to calculate the amount of cost savings that was realized by the guest.

8. The system as recited in claim 1, wherein the administration server uses a utility service provider determined utility usage cost when calculating the amount of cost savings that was realized by the guest.

9. The system as recited in claim 1, wherein the display device comprises a mobile phone.

10. The system as recited in claim 1, wherein the display device comprises a kiosk.

11. The system as recited in claim 1, wherein the display device comprises a television.

12. The system as recited in claim 1, wherein the lodging comprises a hotel room.

* * * * *